Patented Jan. 26, 1943

2,309,392

UNITED STATES PATENT OFFICE 2,309,392

FISH REDUCTION PROCESS

George Rufus Henshall, Victoria, British Columbia, Canada

No Drawing. Application January 7, 1941, Serial No. 373,519. In Canada January 8, 1940

3 Claims. (Cl. 260—412)

My present invention relates to the art of fish reduction and is more particularly described as an improvement in fish reduction processes.

This invention is an improvement on and bears special reference to my patent of the United States of America dated May 16, 1933, Number 1,909,676, and is an improvement and development of the aforesaid patent.

By the use of my improved process as hereinafter set forth I am able to effect a complete separation of the solid matter, as a meal, from the oil and pressed liquors, with a consequently increased efficiency in plant operation; also the digestibility of the metal and the vitamin content of the oil is increased together with other useful objects as will appear.

When my process is employed in the reduction of herring, pilchard, menhaden or other comparatively small fish, it is not necessary to pulp or macerate this type of fish, as the chemicals may be added in two forms as the fish are being conveyed to the cooker: i. e., in a dry or powdered form, or in solution. When used in this latter method the chemicals are added by the "drip" method.

Alternatively, when it is desired to process larger sizes of fish (or fish offal) such as dogfish, sharks and the like, it is necessary first to hash or macerate the fish, then add the chemicals to the macerated or pulped fish, preferably in a dry form by a mechanical mixer. This process takes only a few minutes: the fish being then conveyed directly from the mixer to the cooker.

An important feature of my new process resides in the fact that the fish must enter the cooker immediately the chemicals are mixed with it. This is due to the fact that there is a decided increase in the free fatty acids in the oil content of the fish.

It is to be noted that the proportions of the different chemicals employed will vary to some extent with the acidity and age of the fish being processed: the older the fish the higher the acidity of the pressed liquor, and consequent variation in the proportion of chemicals used. It is found in practice that the pressed liquors from decomposed fish require more coagulant or chemical than fresh fish.

By my process a greater proportion of both oil and meal is recovered and the pressed liquors are more easily filtered. Any solids escaping with the pressed liquor are easily recovered by the now known recovery apparatus for this work.

The clear waste liquors obtained by this process consist of a water solution of protooses and peptones.

By the use of my process the gelatinous gummy condition of the pressed liquors, formerly encountered, which rendered filtration extremely difficult, is now overcome, and the filtration or recovery of any solids in the pressed liquors now can be readily effected.

In my process, when using either of the two above-described classes of fish, I employ—in dry form—165 pounds of ferrous sulphate, 60 pounds of aluminum sulphate with 60 pounds of sodium bisulphate or nitre cake; by the use of this latter a lesser quantity of solid matter is expressed from the press into the pressed liquors. Another important benefit from the use of sodium bisulphate is that a far greater protein content in the meal itself is obtained.

To this mixture I add approximately ten pounds of ferric sulphate, or fifteen pounds of ferric chloride, these two latter function as catalytic agents, causing an immediate chemical action on the fish, by the ferrous sulphate, aluminum sulphate and sodium bisulphate, thus starting to break down the oil cells even before heat is applied to the treated fish.

While the above quantities are usually those found to be most efficacious in processing the fish, it is understood that all quantities may be varied as required to process different types of fish, without departing from the scope of this patent as set forth in the appended claims.

In practice it is found that by the use of the process set forth in my Patent of the United Sttaes Number 1,909,676, one-half of one percent of free iron remains in the meal; by the addition of a small quantity, say five pounds of copper sulphate to each hundred pounds of ferrous salt used, a complete digestibility and assimilation of the iron content of the meal is obtained, along with a high percentage of protein which is found in fish meals. These proteins are fully digestible by the addition of the small percentage of copper sulphate.

I further add fifteen pounds of ferric chloride to the above mixture. It is found that by the addition of ferric chloride all gumminess and stickiness in the liquors leaving the press is removed; this in turn allows a full recovery of all oil from these liquors, using either screens or the centrifuge filter press. Liquors leaving this press contain no oil or solids; this eliminates any disagreeable outside pollution arising from the plant.

Another important feature, as noted above, arising from the use of my improved process lies in the fact that there is an entire absence of all obnoxious odours.

The above chemicals are all reduced to powdered form, thoroughly mixed together and added to the fish or fish offal in the following percentages, according to the kind and age of the fish to be treated—this varies from one to four pounds of powdered chemical to each one hundred pounds of fish to be treated.

As an alternative method, these chemicals may be dissolved in water and added to the fish in the form of a water drip when entering the fish cooker. But whenever possible, it should be added to the fish in the dry form.

In preparing and extracting a fish oil from fish for medical use, I employ a powder or solution containing ferric chloride and aluminum sulphate in the proportion of thirty to one hundred. This is added to the fish to be treated. These two chemicals preserve the vitamin content of the oil by using very low cooking temperatures. In addition this preparation can be used in the treating of pressed liquors in the separation tanks before filtration takes place.

When very cold and decomposed fish is to be treated, I use a powder or solution containing ferrous sulphate, sodium bisulphate, aluminum sulphate and aluminum chloride. The aluminum chloride prevents the formation of emulsions in the pressed liquors, but on fairly fresh fish no advantage is claimed by the use of the aluminum chloride.

When treating quite fresh fish which have not been out of the water more than twenty four hours, I use a mixture or liquid solution of ferrous sulphate with sodium bisulphate in the proportion of one hundred and sixty five to one hundred and twenty five. This gives very good results on fresh fish, but when the fish is over twenty four hours out of the water, this mixture will cause bad emulsions in the pressed liquors causing heavy loss of oil in the separation tanks.

From the foregoing description it is thought that the advantages of the invention will be clear to those skilled in the art.

What I claim is:

1. A fish reduction process comprising treating the fish with a mixture of sodium bisulphate in combination with ferrous sulphate and aluminum sulphate just before the fish enter the cooker.

2. A fish reduction process including, treating the fish with a mixture comprising the proportions of one hundred and sixty five pounds of ferrous sulphate, sixty pounds of sodium bisulphate and sixty pounds of aluminum sulphate in combination with a small quantity of a further metallic salt in a dry form just before the fish enter the cooker, the mixture being in a proportion of one to four pounds of powdered chemical to one hundred pounds of fish to be treated.

3. A process as claimed in claim 2 in which the mixture is applied to the fish in a solution by the "drip" method.

GEORGE RUFUS HENSHALL.